(12) United States Patent
Mizuno

(10) Patent No.: US 8,353,528 B2
(45) Date of Patent: Jan. 15, 2013

(54) SIDE AIRBAG APPARATUS

(75) Inventor: Norio Mizuno, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 166 days.

(21) Appl. No.: 12/585,910

(22) Filed: Sep. 29, 2009

(65) Prior Publication Data

US 2010/0133796 A1 Jun. 3, 2010

(30) Foreign Application Priority Data

Nov. 28, 2008 (JP) ................................ 2008-303565

(51) Int. Cl.
*B60R 21/207* (2006.01)
*B60R 21/23* (2006.01)

(52) U.S. Cl. .................. 280/730.2; 280/743.1; 280/729

(58) Field of Classification Search ............... 280/730.2, 280/743.1, 729
See application file for complete search history.

(56) References Cited

U.S. PATENT DOCUMENTS

| | | | | |
|---|---|---|---|---|
| 5,607,183 | A * | 3/1997 | Nishimura et al. | 280/743.2 |
| 5,848,804 | A * | 12/1998 | White et al. | 280/743.1 |
| 5,857,696 | A * | 1/1999 | Inoue et al. | 280/728.2 |
| 5,927,750 | A * | 7/1999 | Nakamura et al. | 280/730.2 |
| 5,944,342 | A * | 8/1999 | White et al. | 280/729 |
| 6,206,411 | B1 * | 3/2001 | Sunabashiri | 280/730.2 |
| 6,220,629 | B1 * | 4/2001 | Wipasuramonton et al. | 280/743.1 |
| 6,231,069 | B1 * | 5/2001 | Yokoyama | 280/730.2 |
| 6,457,741 | B2 * | 10/2002 | Seki et al. | 280/730.2 |
| 6,478,329 | B1 * | 11/2002 | Yokoyama | 280/729 |
| 7,021,652 | B2 * | 4/2006 | Kumagai et al. | 280/729 |
| 7,207,595 | B2 * | 4/2007 | Kanto et al. | 280/730.2 |
| 7,347,444 | B2 * | 3/2008 | Wheelwright | 280/729 |
| 7,422,235 | B2 * | 9/2008 | Wollin et al. | 280/730.2 |
| 7,556,287 | B2 * | 7/2009 | Inoue et al. | 280/730.2 |
| 7,581,752 | B2 * | 9/2009 | Kai et al. | 280/730.2 |
| 7,819,419 | B2 * | 10/2010 | Hayashi et al. | 280/730.1 |
| 2006/0022441 | A1 | 2/2006 | Hayashi et al. | |

(Continued)

FOREIGN PATENT DOCUMENTS

| JP | A-2005-053465 | 3/2005 |
|---|---|---|
| JP | A-2007-186132 | 7/2007 |

(Continued)

OTHER PUBLICATIONS

Notice of Allowance mailed Aug. 28, 2012 in corresponding JP Application No. 2008-303565.
Office Action mailed Apr. 24, 2012 issued in corresponding JP application No. 2008-303565.

*Primary Examiner* — Eric Culbreth
*Assistant Examiner* — George Spisich
(74) *Attorney, Agent, or Firm* — Posz Law Group, PLC

(57) ABSTRACT

A pressure reducing portion is formed by joining two fabric portions at a position corresponding to an occupant's arm. The pressure reducing portion limits the thickness of the airbag in the widthwise direction of a vehicle and prevents the arm from being pressed inward in the widthwise direction. A support joint portion joins the fabric portions at a position below the lower end of the pressure reducing portion and behind the front end of the pressure reducing portion when the airbag is arranged in such a manner that a linear portion of the airbag extends vertically. The support joint portion projects toward the pressure reducing portion beyond the line including the lower end of the airbag and the lower end of the linear portion. The end of the support joint portion located close to the pressure reducing portion is located below the lower end of the pressure reducing portion.

4 Claims, 10 Drawing Sheets

U.S. PATENT DOCUMENTS

| | | | |
|---|---|---|---|
| 2006/0108777 A1* | 5/2006 | Mabuchi et al. | 280/730.2 |
| 2007/0164546 A1* | 7/2007 | Kai et al. | 280/730.2 |
| 2007/0290488 A1 | 12/2007 | Taguchi et al. | |
| 2009/0072523 A1* | 3/2009 | Yokota | 280/730.2 |
| 2009/0079171 A1* | 3/2009 | Dix et al. | 280/730.2 |
| 2009/0283991 A1* | 11/2009 | Honda | 280/729 |

FOREIGN PATENT DOCUMENTS

| | | |
|---|---|---|
| JP | A-2008-24286 | 2/2008 |
| WO | WO 2004/065179 | 8/2004 |

* cited by examiner

Rear ← → Front

Rear ←         → Front

Rear ← → Front

SIDE AIRBAG APPARATUS

BACKGROUND OF THE INVENTION

The present invention relates to a side airbag apparatus that protects an occupant of a vehicle from a side impact received by the vehicle.

A side airbag apparatus having an inflator and an airbag is broadly known as an apparatus for protecting an occupant of a vehicle from a side impact applied to the vehicle in a side collision. The airbag is formed by laying an inner fabric portion and an outer fabric portion on top of each other in the widthwise direction of the vehicle and joining the fabric portions together in a bag-like shape. The inflator is arranged in a rear end portion of the interior of the airbag. The airbag, together with the inflator, is incorporated in the back of a seat of the vehicle in a compactly folded state. When a side impact is applied to a side portion of the body of the vehicle, such as a side door, the inflator of the side airbag apparatus supplies inflation gas into the airbag. The inflation gas inflates and deploys the airbag in the forward direction of the vehicle out from the seat back in the narrow space between the occupant seated on the vehicle seat and the body side portion. This attenuates the side impact transmitted to the occupant through the body side portion.

It is known that the lumbar region of the human body generally has superior impact resistance to that of the thorax or the abdomen. However, when the airbag of the aforementioned side airbag apparatus is inflated and deployed, there may be cases in which the airbag presses the corresponding arm of the occupant inward in the widthwise direction of the vehicle. In this case, the thorax or the abdomen of the occupant, which has inferior impact resistance, may receive pressure from the arm.

To solve this problem, Japanese Laid-Open Patent Publication No. 2005-53465, for example, discloses a side airbag apparatus having a looped pressure reducing portion for reducing pressure applied by the arm of the occupant, which portion is arranged in a part of the airbag corresponding to the arm of the occupant. The pressure reducing portion is formed by joining the inner fabric portion and the outer fabric portion with each other at a position corresponding to the arm of the occupant. The side airbag apparatus with the pressure reducing portion limits the thickness of the part of the airbag in which the pressure reducing portion is located in the widthwise direction of the vehicle. This prevents the airbag from pressing the arm of the occupant inward in the widthwise direction of the vehicle and applying pressure onto the thorax or the abdomen.

However, if the arm of the occupant is located offset downward from the pressure reducing portion of the side airbag apparatus before the airbag is inflated and deployed, the following problem will occur. Specifically, when the airbag is inflated and deployed, the portion of the airbag located below the pressure reducing portion, that is, a portion that has a greater thickness in the widthwise direction of the vehicle than the pressure reducing portion, may press the arm of the occupant inward in the widthwise direction of the vehicle. As a result, the intended effect of the pressure reducing portion to prevent the arm of the occupant from applying pressure onto the thorax or the abdomen may not be brought about sufficiently.

To avoid this problem, the area of the pressure reducing portion may be enlarged. However, since an area (a protection area) with a sufficiently great thickness must be ensured in the airbag, the area of the pressure reducing portion can be enlarged only to a limited extent.

SUMMARY OF THE INVENTION

Accordingly, it is an objective of the present invention to provide a side airbag apparatus that prevents an arm of an occupant from applying pressure onto the thorax or its proximity even if the arm is located offset downward from a pressure reducing portion before the airbag is inflated and deployed, thus improving performance of restraining the occupant.

To achieve the foregoing objective and in accordance with a first aspect of the present invention, a side airbag apparatus including an airbag, an inflator, and a looped pressure reducing portion is provided. The airbag is formed in a bag-like shape by laying an inner fabric portion and an outer fabric portion on top of each other along a widthwise direction of a vehicle and joining the peripheral portions of the inner and outer fabric portions with each other. The inflator supplies inflation gas into the airbag in response to a side impact applied to the vehicle and inflates and deploys the airbag between an occupant seated on a vehicle seat and a body side portion of the vehicle and toward a front portion of the vehicle. The looped pressure reducing portion is formed by joining the inner fabric portion and the outer fabric portion together at a position corresponding to an arm of the occupant. The airbag has a linear portion that extends substantially perpendicularly to a deploying direction of the airbag and is located at a rear end portion of the airbag. The pressure reducing portion limiting a thickness of the airbag in the widthwise direction of the vehicle at the position corresponding to the arm of the occupant, thereby preventing the airbag from pressing the arm inward in the widthwise direction of the vehicle. A support joint portion joining the inner fabric portion and the outer fabric portion together is arranged at a position that is located below a lower end of the pressure reducing portion and behind a front end of the pressure reducing portion when the airbag is arranged in such a manner that the linear portion is held in a posture extending vertically. The support joint portion projects toward the pressure reducing portion beyond a line including a lower end of the airbag and a lower end of the linear portion. An end of the support joint portion located close to the pressure reducing portion is located below the lower end of the pressure reducing portion.

In accordance with a second aspect of the present invention, a side airbag apparatus including an airbag, an inflator, and a looped pressure reducing portion is provided. The airbag is formed in a bag-like shape by laying an inner fabric portion and an outer fabric portion on top of each other along a widthwise direction of a vehicle and joining the peripheral portions of the inner and outer fabric portions with each other. The inflator supplies inflation gas into the airbag in response to a side impact applied to the vehicle and inflates and deploys the airbag between an occupant seated on a vehicle seat and a body side portion of the vehicle and toward a front portion of the vehicle. The looped pressure reducing portion is formed by joining the inner fabric portion and the outer fabric portion together at a position corresponding to an arm of the occupant. The airbag has a linear portion that extends substantially perpendicularly to a deploying direction of the airbag and is located at a rear end portion of the airbag. The inflator is arranged in the linear portion of the airbag. The pressure reducing portion limits a thickness of the airbag in the widthwise direction of the vehicle at the position corresponding to the arm of the occupant, thereby preventing the airbag from pressing the arm inward in the widthwise direction of the vehicle. A support joint portion joining the inner fabric portion and the outer fabric portion together is arranged at a position that is located below a lower end of the pressure reducing portion and behind a front end of the pressure reducing portion when the airbag is arranged in such a manner that the linear portion is held in a posture extending vertically. The support joint portion projects toward the pressure reducing portion beyond a line including a lower end of the airbag and a lower end of the inflator. An end of the support joint portion located close to the pressure reducing portion is located below the lower end of the pressure reducing portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 13(B). In the description below, the proceeding direction (the advancing direction) of a vehicle will be defined as the forward direction of the vehicle.

Figure 2:
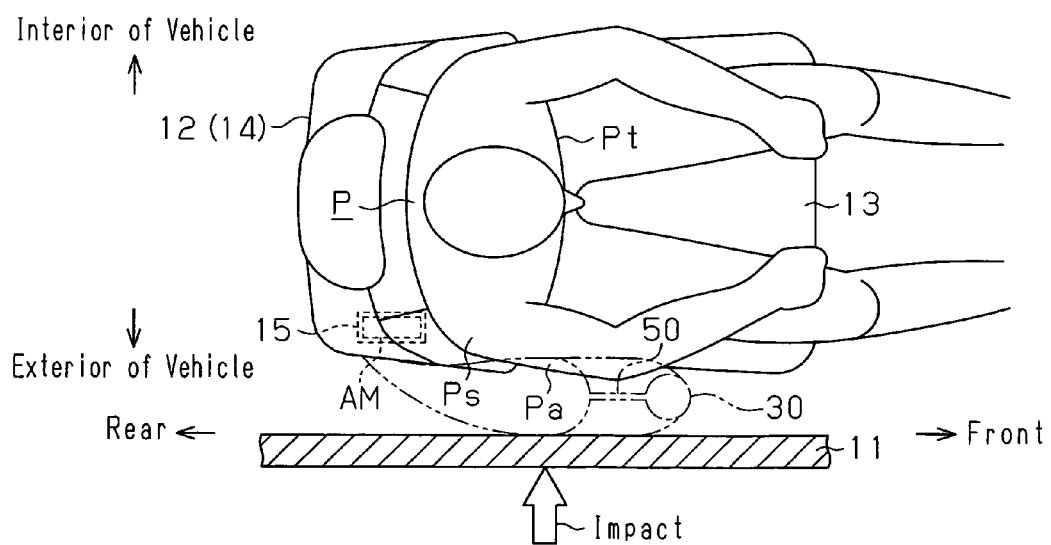
FIG. 2 is a partially cross-sectional view illustrating, together with the occupant, the relationship between the position of the vehicle seat and the position of a body side portion.

As shown in FIG. 2, a vehicle seat 12 is arranged in the vicinity of a body side portion 11 at the side corresponding to the interior of the vehicle (an upper portion of FIG. 2). The body side portion 11 is a component arranged at a side portion of the vehicle. The body side portion 11 corresponding to a front seat may be, for example, a front door and a center pillar (a B-pillar). The body side portion 11 corresponding to a rear seat may be, for example, a rear portion of a side door (a rear door), a C-pillar, a front portion of a wheel well, and a rear quarter.

Figure 1:
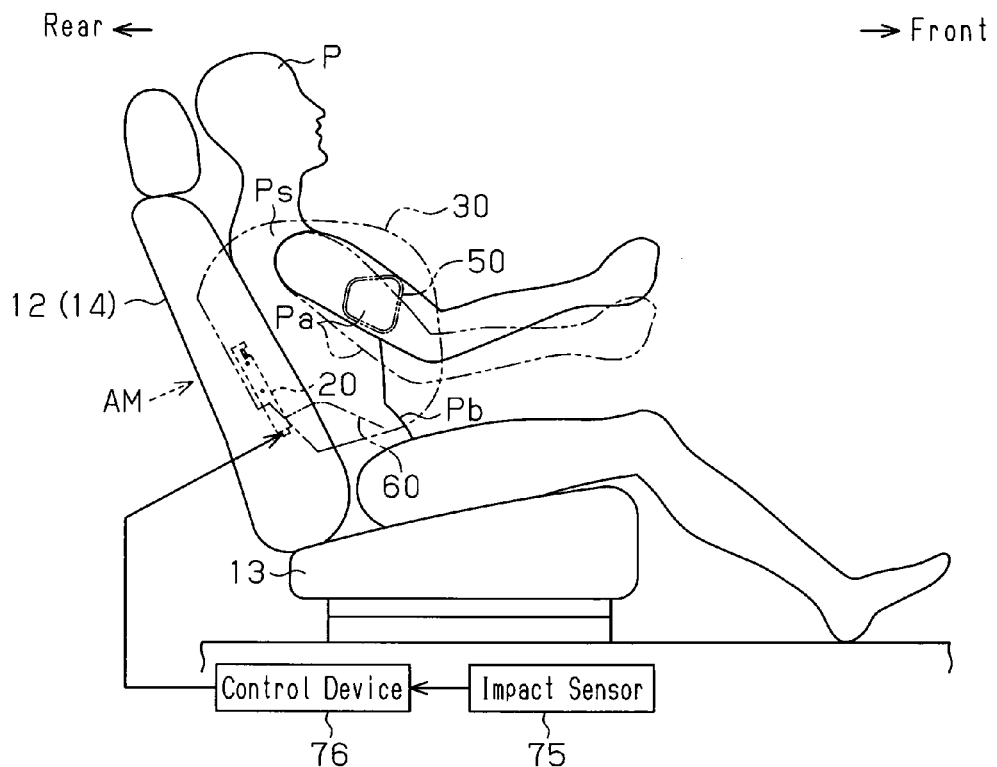
FIG. 1 is a side view showing, together with an occupant, a seat of a vehicle in which a side airbag apparatus according to one embodiment of the present invention is installed.

With reference to FIGS. 1 and 2, the vehicle seat 12 has a seat cushion (a seating portion) 13 and a seat back (a backrest portion) 14. The seat back 14 extends upright from the rear side of the seat cushion 13 and has an inclination adjustment mechanism (not shown). An accommodating portion 15 is arranged in a side portion of the seat back 14 at the side corresponding to the exterior of vehicle. The accommodating portion 15 accommodates an airbag module AM, which is a main portion of a side airbag apparatus. The accommodating portion 15 is located in the vicinity of and diagonally behind an occupant P seated on the vehicle seat 12.

Specifically, the accommodating portion 15 is located in the vicinity of and diagonally behind the upper body of the occupant P seated on the vehicle seat 12. The upper body of the occupant P refers to the area from the shoulders Ps to the abdomen Ps of the occupant P, or, mainly, the thorax Pt of the occupant P. The position "in the vicinity of and diagonally behind the occupant P" corresponds to the interior of the seat back 14 in the present embodiment, but may be the interior of the body side portion 11, which is, for example, the interior of a door trim (not shown).

Figure 3:
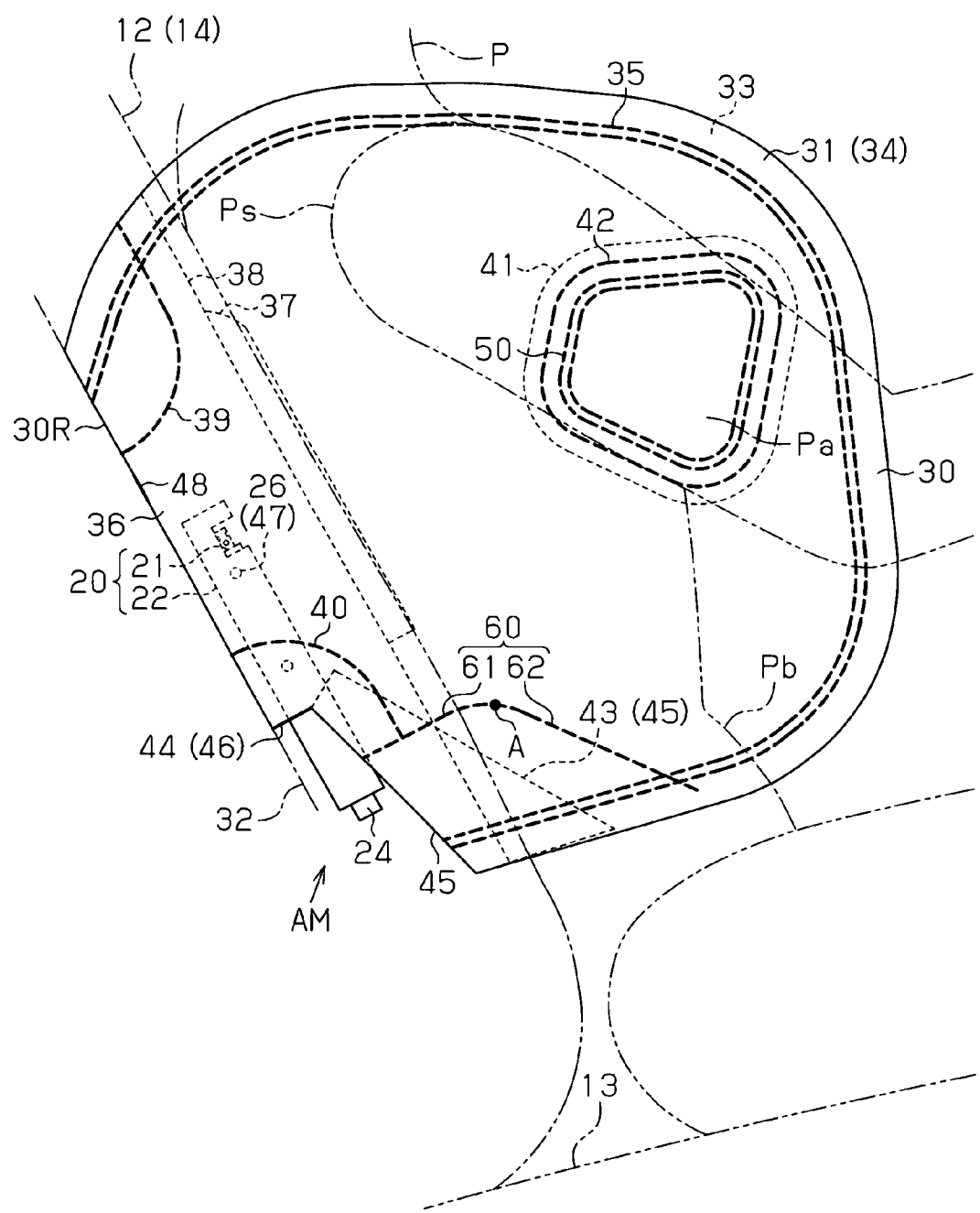
FIG. 3 is a side view schematically showing an airbag module, together with the occupant, in a state where an airbag deployed without being filled with inflation gas.

As shown in FIG. 3, the airbag module AM includes an inflator assembly 20, an airbag 30, a pressure reducing portion 50, and a support joint portion 60 as main components. Each of these components will be described below. In the present embodiment, an up-and-down direction and a front-and-rear direction of the airbag module AM and the components of the airbag module AM are defined with reference to the seat back 14 of the vehicle seat 12. The up-and-down direction is the direction in which the seat back 14 extends upright and the front-and-rear direction is a direction perpendicular to the up-and-down direction substantially in the front-and-rear direction of the vehicle. Since the seat back 14 is normally used in an inclined state, the up-and-down direction is not strictly vertical but slightly inclined. Similarly, the front- and rear direction is not strictly horizontal but slightly inclined.

<Inflator Assembly 20>

Figure 4:
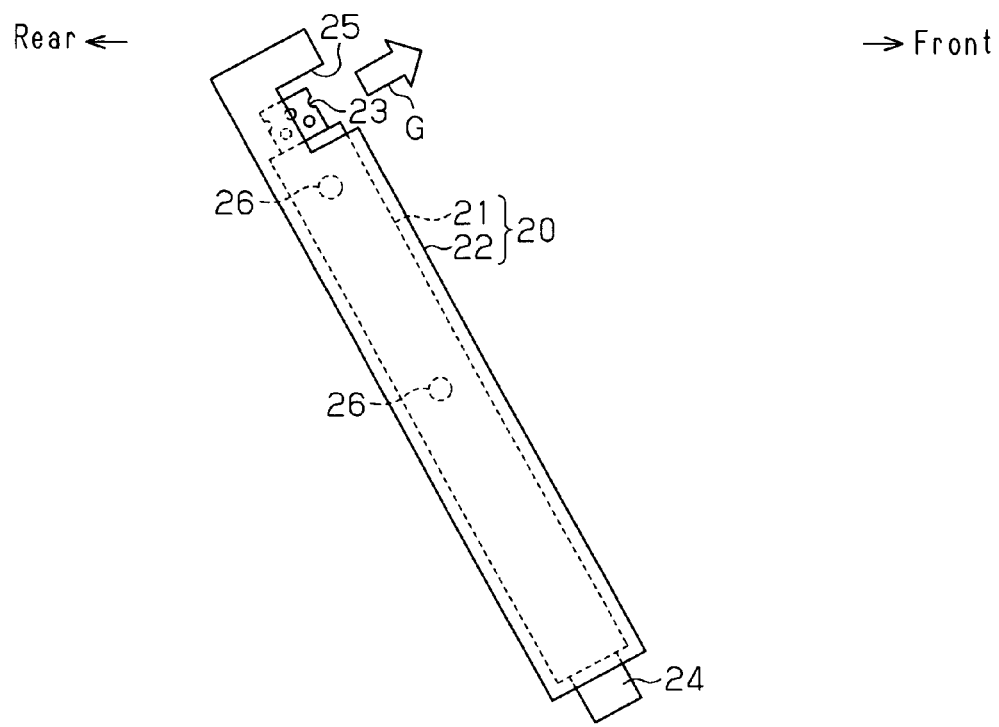
FIG. 4 is a side view showing an inflator assembly.
Figure 5:
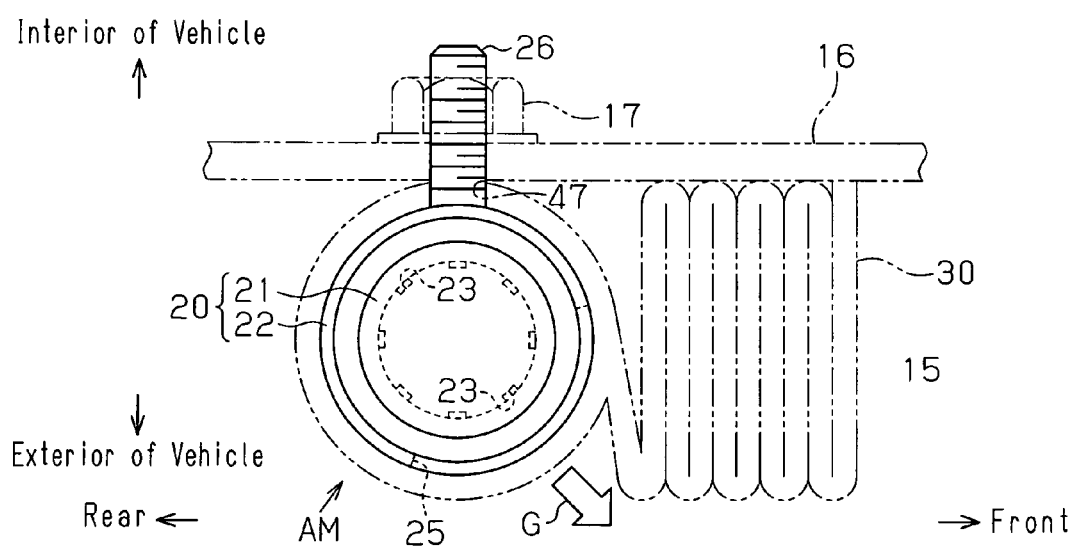
FIG. 5 is a plan view showing the inflator assembly illustrated in FIG. 4, together with the airbag, a seat frame, and a bolt, as viewed from diagonally above and behind.

As illustrated in FIGS. 4 and 5, the inflator assembly 20 has an inflator 21 serving as a gas generation source and a retainer 22 arranged around the inflator 21. The inflator 21 is shaped substantially as a column extending substantially in the up-and-down direction. A gas generating agent (not illustrated), which generates inflation gas G in response to an external activation signal, is received in the inflator 21. A plurality of gas ports 23 are formed in an upper end portion of the inflator 21. After having been generated, the inflation gas G is discharged outward through each of the gas ports 23 along a radial direction of the inflator 21. A connector portion 24 is arranged at the lower end of the inflator 21. A cable (not shown) through which a control signal is sent to the inflator 21 is connected to the connector portion 24.

Instead of the aforementioned type of the inflator using the gas generating agent, a type that breaks a partition wall of a high-pressure gas cylinder, in which high-pressure gas is retained, using explosive and thus discharges the inflation gas G may be used as the inflator 21.

The retainer 22 functions as a diffuser and fixes the inflator 21, together with the airbag 30, to a seat frame 16 (represented by the double-dotted chain lines in FIG. 5) arranged in the seat back 14. The retainer 22 is formed by a plate such as a metal plate and shaped through bending substantially like a tube elongated in the up-and-down direction. A window portion 25, through which some of the gas ports 23 of the inflator 21 are exposed, is formed in an upper front portion of the retainer 22. After having been discharged from the gas ports 23, the inflation gas G is sent generally in the forward direction of the vehicle through the window portion 25.

A plurality of (in the present embodiment, two) bolts 26 are fixed to the retainer 22. The bolts 26 each function as an engagement member by which the retainer 22 is attached to the seat frame 16. In other words, both bolts 26 are fixed to the inflator 21 indirectly through the retainer 22. The bolts 26 each extend in a direction perpendicular to the axis of the inflator 21.

The inflator 21 and the retainer 22 of the inflator assembly 20 may be formed as an integral body.

<Airbag 30>

As shown in FIG. 2, the airbag 30 is inflated and deployed by the inflation gas G discharged from the inflator 21 when a side impact is applied to the body side portion 11 from outside the vehicle. Specifically, the airbag 30 pops out of the accommodating portion 15 substantially in the forward direction of the vehicle with a portion (a rear portion) of the airbag 30 maintained in the accommodating portion 15. The airbag 30 is thus inflated and deployed between the vehicle seat 12 and the body side portion 11. This restrains and protects the occupant P from the impact.

Figure 6:
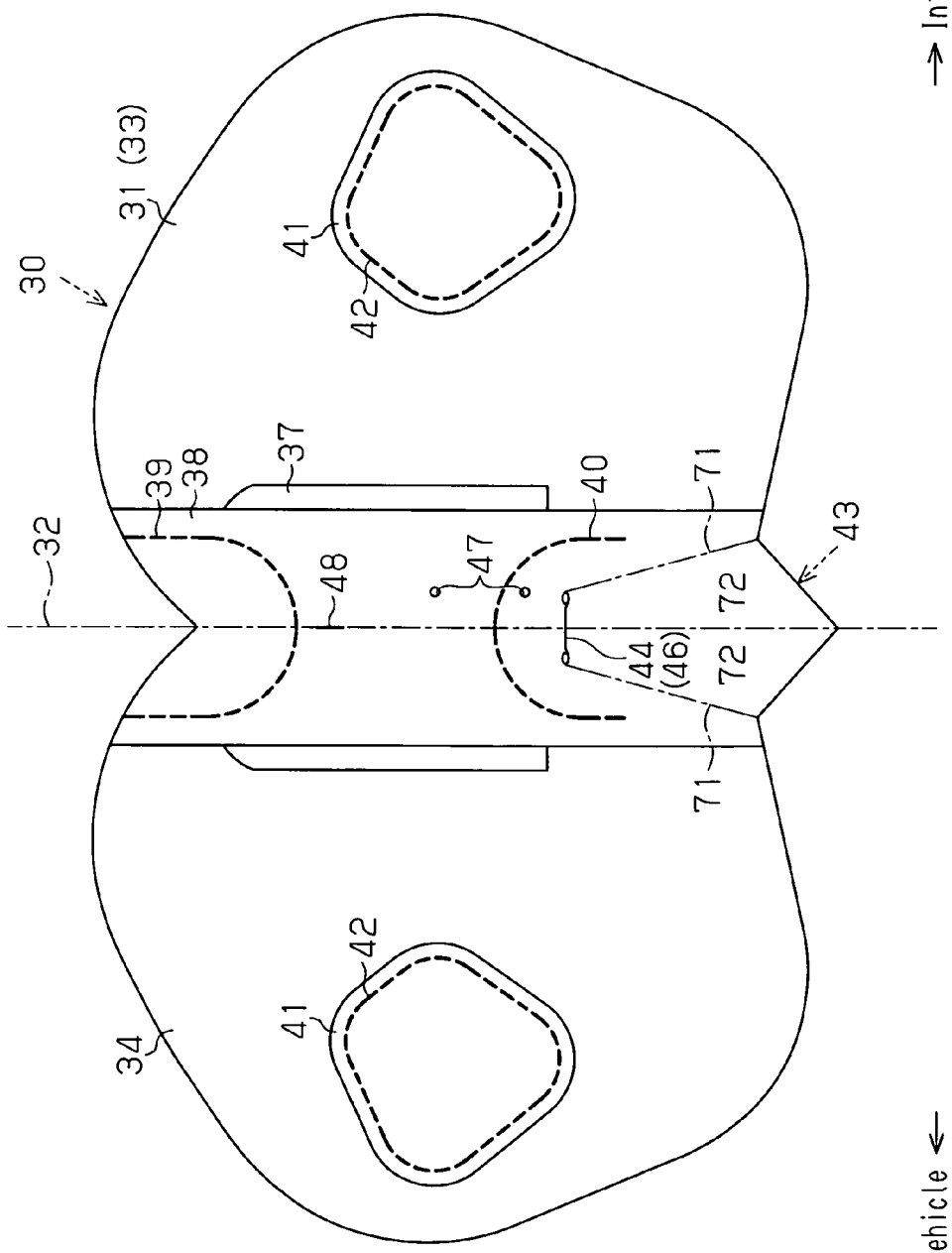
FIG. 6 is a development view illustrating a step of manufacturing the airbag module, including a panel fabric and various types of reinforcing fabrics sewn onto the panel fabric.

FIG. 3 schematically shows the airbag module AM when the airbag 30 is spread without being filled with the inflation gas G. FIG. 6 illustrates a transitional stage of manufacturing the airbag 30. With reference to FIGS. 3 and 6, the airbag 30 is formed by folding and sewing a panel fabric (referred to also as a base fabric) 31, which is a single sheet of fabric, in the manner described below. Specifically, the panel fabric 31 is folded in half along a fold line 32 defined along the midline of the panel fabric 31 and layered in the widthwise direction of the vehicle. The layered portions are then joined together in a bag-like shape. In the two overlapped portions of the airbag 30, the portion located at the side corresponding to the interior of the vehicle is referred to as an inner fabric portion 33. The portion located at the side corresponding to the exterior of the vehicle is referred to as an outer fabric portion 34. The inner fabric portion 33 and the outer fabric portion 34 of the panel fabric 31 have line-symmetric shapes with respect to the fold line 32 serving as the axis of symmetry.

A material that has a high strength and flexibility and is easily foldable, such as a woven fabric formed from, for example, polyester threads or polyamide threads, is suitable for the panel fabric 31. The inner fabric portion 33 and the outer fabric portion 34 are each shaped and sized in such a manner that, when the airbag 30 is inflated and deployed between the vehicle seat 12 and the body side portion 11, the airbag 30 is capable of occupying the area corresponding to the side of the human body from the abdomen Pb to the shoulder Ps in the vicinity of and outside the occupant P seated on the vehicle seat 12 (see FIG. 3).

The inner fabric portion 33 and the outer fabric portion 34 are joined with each other along a peripheral joint portion 35, which is arranged in the peripheral portions of the fabric portions 33, 34. In the present embodiment, the peripheral joint portion 35 is formed by sewing the peripheral portion of the inner fabric portion 33 and the peripheral portion of the outer fabric portion 34 with each other using sewing thread. The peripheral joint portion 35 is represented by the bold chain lines in the drawing. Joint portions 39, 40, 42, the pressure reducing portion 50, and the support joint portion 60, which will be described below, are also represented by chain lines.

The airbag 30 may be formed by laying a pair of independent panel fabrics 31 on top of each other in the widthwise direction of the vehicle and joining the panel fabrics 31 together in a bag-like shape. In this case, the panel fabric 31 located at the side corresponding to the interior of the vehicle is the inner fabric portion 33, and the panel fabric 31 located at the side corresponding to the exterior of the vehicle is the outer fabric portion 34. Alternatively, the peripheral joint portion 35 may be formed by means different from sewing with the sewing thread, such as bonding using adhesive.

As has been described, the airbag 30 is formed by folding the panel fabric 31 in half along the fold line 32, which extends substantially in the up-and-down direction. A rear end 30R of the airbag 30 thus extends substantially in the up-and-down direction. A portion of the airbag 30 in the vicinity of and in front of the rear end 30R, including the rear end 30R, is referred to as a linear portion 36. The linear portion 36 extends substantially in the up-and-down direction, which is, in other words, a direction substantially perpendicular to the direction in which the airbag 30 is deployed.

With reference to FIGS. 3 and 6, three types of reinforcing fabrics are arranged in the airbag 30. The reinforcing fabrics protect the airbag 30 and the pressure reducing portion 50 from the heat and pressure generated by the inflation gas G. More specifically, a first reinforcing fabric 37 extending in the up-and-down direction is arranged in a rear portion of the airbag 30. A second reinforcing fabric 38 longer than the first reinforcing fabric 37 in the up-and-down direction is laid on top of and located inwardly with respect to the first reinforcing fabric 37. Two joint portions 39, 40 are arranged in the rear portion of the airbag 30 and spaced apart in the up-and-down direction. The first reinforcing fabric 37 and the second reinforcing fabric 38 are joined with the panel fabric 31 (the inner fabric portion 33 and the outer fabric portion 34) through the joint portions 39, 40.

When the airbag 30 is inflated and deployed, a pair of third reinforcing fabrics 41, each having a substantial rectangular shape (a substantial trapezoidal shape), are arranged in the airbag 30 each at the position spaced from the corresponding one of the first reinforcing fabric 37 and the second reinforcing fabric 38 in the forward direction of the vehicle. Both third reinforcing fabrics 41 are arranged at such positions that, when the occupant P (an adult) with a standard body size is seated in a standard posture and the airbag 30 is inflated and deployed, the third reinforcing fabrics 41 are located beside the arm (the upper arm) Pa of the occupant P. The standard posture may be, for example, the posture of a driver when the driver grips the steering wheel. In the present embodiment, both third reinforcing fabrics 41 are arranged at the positions corresponding to substantial centers of the airbag 30 in the up-and-down direction and at the positions close to the front end of the airbag 30 in the front-and-rear direction. The third reinforcing fabrics 41 are each joined with the corresponding one of the inner fabric portion 33 and the outer fabric portion 34 through a joint portion 42, which is arranged along the peripheral portions of the third reinforcing fabrics 41.

The above-described joint portions 39, 40, 42 are formed by sewing the corresponding reinforcing fabrics 37, 38, 41 onto the airbag 30 (the inner fabric portion 33 and the outer fabric portion 34) using sewing threads.

An fold-in portion 43 is formed at the lower end of the rear portion of the airbag 30. The fold-in portion 43 is formed by folding a lower portion of the panel fabric 31 (the inner fabric portion 33 and the outer fabric portion 34) into the other portions of the panel fabric 31 (see FIG. 10). As illustrated in FIG. 3, when the airbag 30 is viewed from outside, an upper peripheral portion 44 and an inclined peripheral portion 45 appear. The upper peripheral portion 44 extends from the rear end 30R in the forward direction of the vehicle. The inclined peripheral portion 45 extends diagonally forward and downward from the front end of the upper peripheral portion 44. A slit 46 is formed in the upper peripheral portion 44 in such a manner that the interior and the exterior of the airbag 30 communicate with each other, so that the inflator assembly 20 is passed through the slit 46.

Each one of the inner fabric portion 33, the first reinforcing fabric 37, and the second reinforcing fabric 38 has a plurality of (two) bolt holes 47 through which the bolts 26 (see FIG. 5) of the retainer 22 are inserted. The bolt holes 47 are formed in the portions of the inner fabric portion 33, the first reinforcing fabric 37, and the second reinforcing fabric 38 that are in the vicinity of the fold line 32 and above the slit 46. A most part of the inflator assembly 20 is accommodated in the linear portion 36 of the airbag 30. A lower portion of the inflator assembly 20 extends through the slit 46 and is exposed to the exterior of the airbag 30. The bolts 26 of the retainer 22 are passed through the corresponding bolt holes 47.

A vent slit 48, which extends along the fold line 32, is formed in a portion of the linear portion 36 of the airbag 30 located above the inflator assembly 20. The vent slit 48 releases the inflation gas G to the exterior of the airbag 30 after the inflation gas G has inflated the airbag 30.

<Pressure Reducing Portion 50>

The pressure reducing portion 50 is arranged in a portion of the airbag 30 corresponding to the arm Pa of the occupant P. The pressure reducing portion 50 limits the thickness of the portion of the airbag 30 corresponding to the arm Pa in the widthwise direction of the vehicle. This prevents the airbag 30 from intensely pressing the arm Pa inward in the widthwise direction of the vehicle. The pressure reducing portion 50 is formed by sewing the inner fabric portion 33 and the outer fabric portion 34 with the two third reinforcing fabrics 41, which are sewn onto the inner sides of the corresponding fabric portions 33, 34 to have a loop-like shape (in the present embodiment, a substantially rectangular shape), using sewing threads loop shape (see FIG. 11).

<Support Joint Portion 60>

The support joint portion 60 is arranged in a lower end portion of the rear portion of the airbag 30 at a position where the following condition (i) is met in such a manner as to satisfy the conditions (ii) and (iii). The support joint portion 60 shifts upward the portion of the airbag 30 of which the thickness in the widthwise direction of the vehicle becomes maximum when the airbag 30 is inflated.

Figure 9:
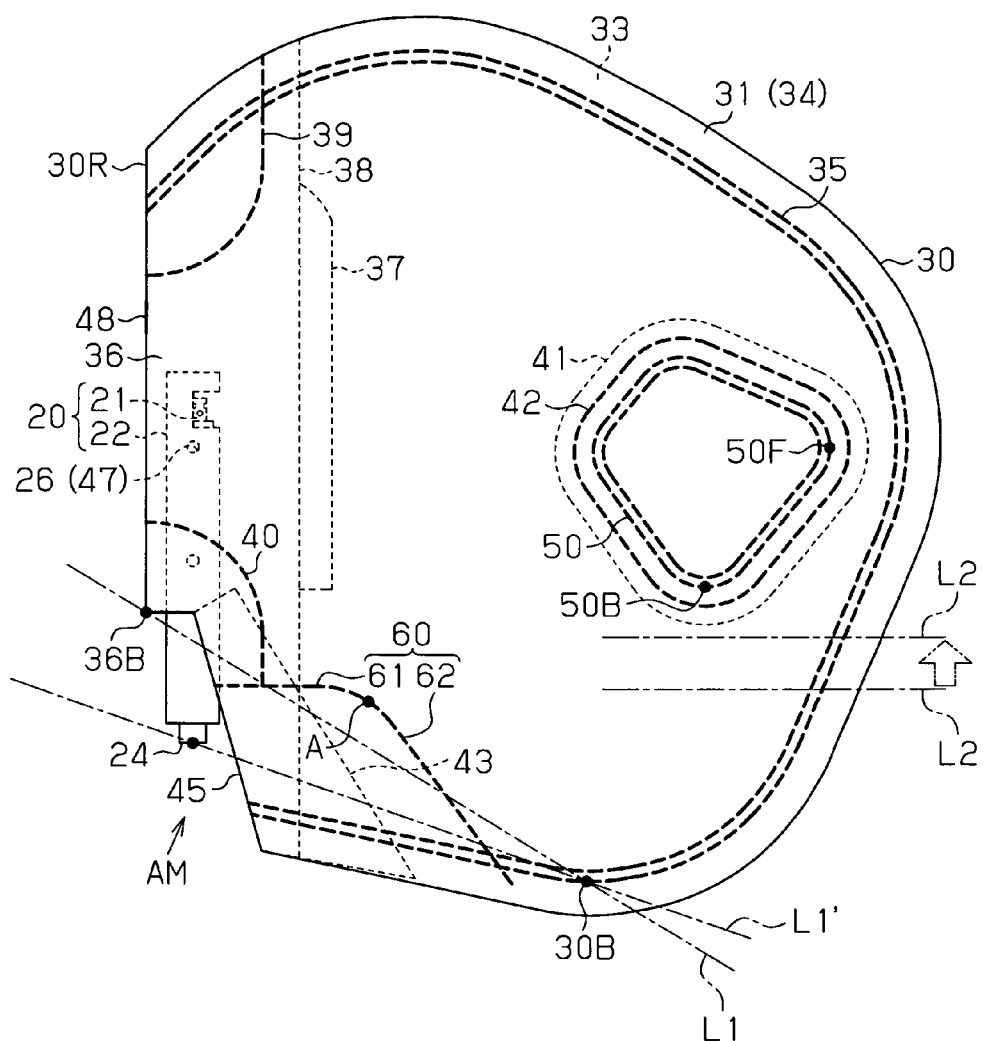
FIG. 9 is a side view illustrating a step of manufacturing the airbag module, in which the inflator assembly is attached to the airbag and the rest of the peripheral joint portion is formed.
Figure 10:
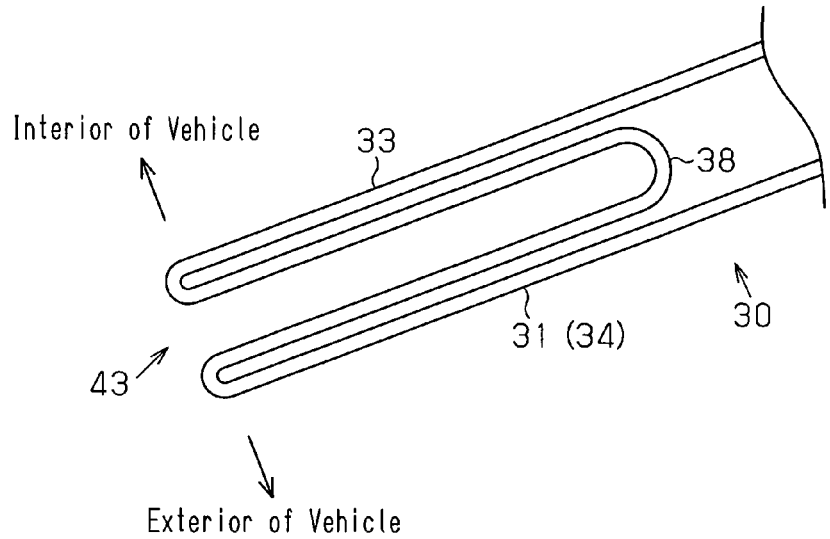
FIG. 10 is an enlarged cross-sectional view taken along line 10-10 of FIG. 8.
Figure 11:
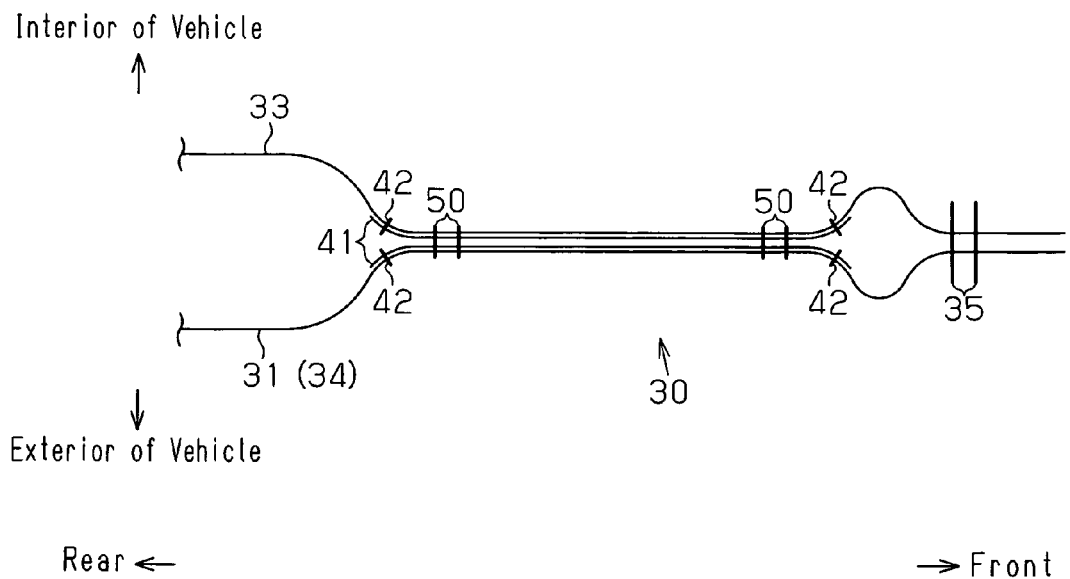
FIG. 11 is an enlarged cross-sectional view taken along line 11-11 of FIG. 8.

Condition (i): As shown in FIG. 9, when the airbag 30 is arranged in such a posture that the linear portion 36 extends vertically, the support joint portion 60 must be located at a position in the airbag 30 that is lower than the lower end 50B of the pressure reducing portion 50 and behind the front end 50F of the pressure reducing portion 50.

Condition (ii): The support joint portion 60 has a portion (a projection) projecting toward the pressure reducing portion 50 beyond line L1 including the lower end 30B of the airbag 30 and the lower end 36B of the linear portion 36.

Condition (iii): The end A of the support joint portion 60 projecting toward the pressure reducing portion 50 is located below the lower end 50B of the pressure reducing portion 50.

The lower end 30B of the airbag 30 is the lowermost portion of the portion of the airbag 30 that is inflated. In this case, the lower end 30B is the lowermost portion of the peripheral joint portion 35.

In the present embodiment, the lower portion of the inflator assembly 20 is exposed from the airbag 30. The lower end of the inflator 21 is located lower than the lower end 36B of the linear portion 36. Accordingly, when the support joint portion 60 has the portion projecting toward the pressure reducing portion 50 beyond line L1, the support joint portion 60 projects toward the pressure reducing portion 50 beyond line L1' including the lower end 30B of the airbag 30 and the lower end of the inflator 21. Line L1' includes the center of the lower end (the point at which line L1' and the axis of the inflator 21 intersect) of the inflator 21 (the connector portion 24).

The inner fabric portion 33 and the outer fabric portion 34 are sewn together along a bent sawing line in such a manner as to satisfy the above-described conditions (i), (ii), and (iii). The support joint portion 60 has a first extended portion 61 and a second extended portion 62. The first extended portion 61 extends horizontally from the inclined peripheral portion 45 of the fold-in portion 43 in the forward direction of the vehicle. The second extended portion 62 extends diagonally forward and downward from the front end of the first extended portion 61 and reaches a lower portion of the peripheral joint portion 35. A boundary portion of the support joint portion 60, by which the first extended portion 61 and the second extended portion 62 are joined together, is bent. The boundary portion of the support joint portion 60 is located closest to the pressure reducing portion 50 in the support joint portion 60 and thus corresponds to the aforementioned end A of the support joint portion 60. That is, the support joint portion 60 of the present embodiment has the single end A.

The airbag module AM, which configuration is described above, is fabricated through, for example, the following steps (I) to (VII).

(I) Step of Joining Reinforcing Fabrics 37, 38, 41

FIG. 6 illustrates the panel fabric 31 and the reinforcing fabrics 37, 38, 41 before the panel fabric 31 is folded in half, that is, when the panel fabric 31 is in a spread state. The first reinforcing fabric 37 and the second reinforcing fabric 38 are laid on top of the panel fabric 31 in this order and sawn onto the panel fabric 31 using sawing threads. Specifically, the reinforcing fabrics 37, 38 are sewn onto the panel fabric 31 at two positions that are spaced apart in the up-and-down direction of the panel fabric 31. This provides the upper joint portion 39 and the lower joint portion 40, thus joining the reinforcing fabrics 37, 38 with the panel fabric 31. Then, the two third reinforcing fabrics 41 are each laid on top of the panel fabric 31 and sewn onto the panel fabric 31 using sewing threads. This forms a pair of the joint portions 42 and thus joins the third reinforcing fabrics 41 with the panel fabric 31.

(II) Step of Forming Slit 46

Subsequently, the vent slit 48, which is elongated in the up-and-down direction, is formed in the central portion of the panel fabric 31 in the left-and-right direction, the first reinforcing fabric 37 above the central portion of the panel fabric 31, and the second reinforcing fabric 38 above the first reinforcing fabric 37. The two bolt holes 47 are then formed in the inner fabric portion 33 of the panel fabric 31, the first reinforcing fabric 37 above the inner fabric portion 33, and the second reinforcing fabric 38 above the first reinforcing fabric 37 at positions spaced downward from the vent slit 48. Then, the slit 46, which extends laterally, is formed in the central portion of the panel fabric 31 in the left-and-right direction and the second reinforcing fabric 38 above the central portion of the panel fabric 31.

(III) Step of Folding Panel Fabric 31

As illustrated in FIG. 6, the fold line 32 is set along the midline of the panel fabric 31 in the spread state in the left-and-right direction. A pair of auxiliary fold lines 71, which are inclined with respect to the fold line 32, are set at the positions at the left and right sides of the fold line 32 in a lower portion of the panel fabric 31. In this state, each one of the auxiliary fold lines 71 includes the corresponding one of the ends of the slit 46.

Figure 7:
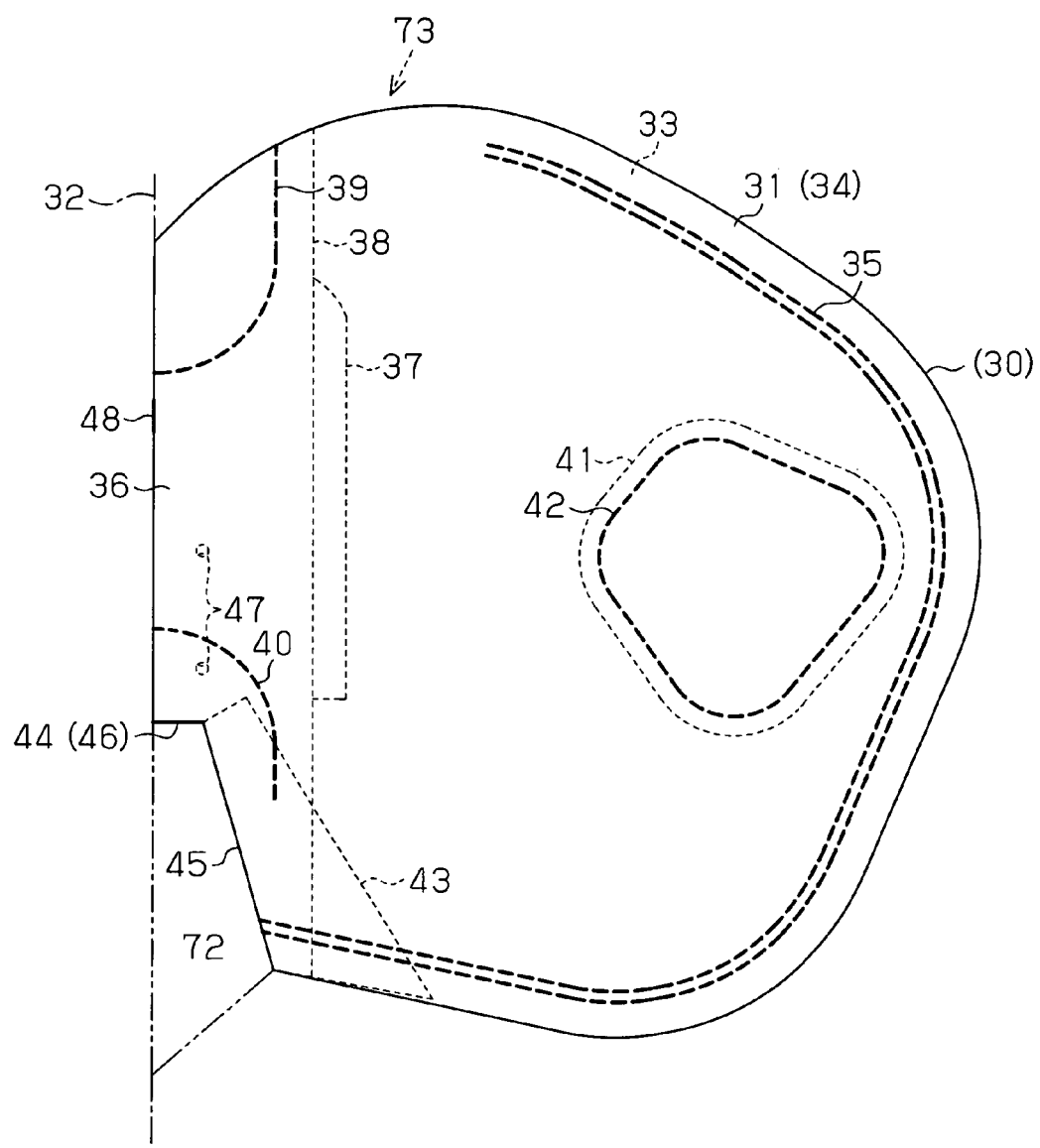
FIG. 7 is a side view illustrating a step of manufacturing the airbag module, in which a most part of a peripheral joint portion is formed in an inner fabric portion and an outer fabric portion, which are laid on top of each other.

In the airbag 30, the auxiliary fold lines 71, the fold line 32, and the slit 46 define two areas 72. Each of the areas 72 is folded forward along the corresponding auxiliary fold line 71 and folded backward along the fold line 32. The panel fabric 31 is folded forward in half along the fold line 32. With reference to FIGS. 6 and 7, the inner fabric portion 33 and the outer fabric portion 34 are formed through such folding. Further, the fold-in portion 43, which is received in the airbag 30, is formed.

(IV) Step of Sewing Panel Fabric 31

After having been folded in the folding step (III), the inner fabric portion 33 and the outer fabric portion 34 are sewn together along the peripheral portions of the fabric portions 33, 34 using sewing threads. To secure an insertion hole 73, through which the inflator assembly 20 is inserted into the airbag 30, a portion (an upper portion) of the peripheral portion of each of the inner and outer fabric portions 33, 34 is prevented from being sewn when the fabric portions 33, 34 are sewn together. In this manner, a most part of the peripheral joint portion 35 is formed and an intermediate body (a incomplete product) of the airbag 30, which has a substantially bag-like shape, is provided.

(V) Step of Forming Support Joint Portion 60 and Pressure Reducing Joint Portion 50

Figure 8:
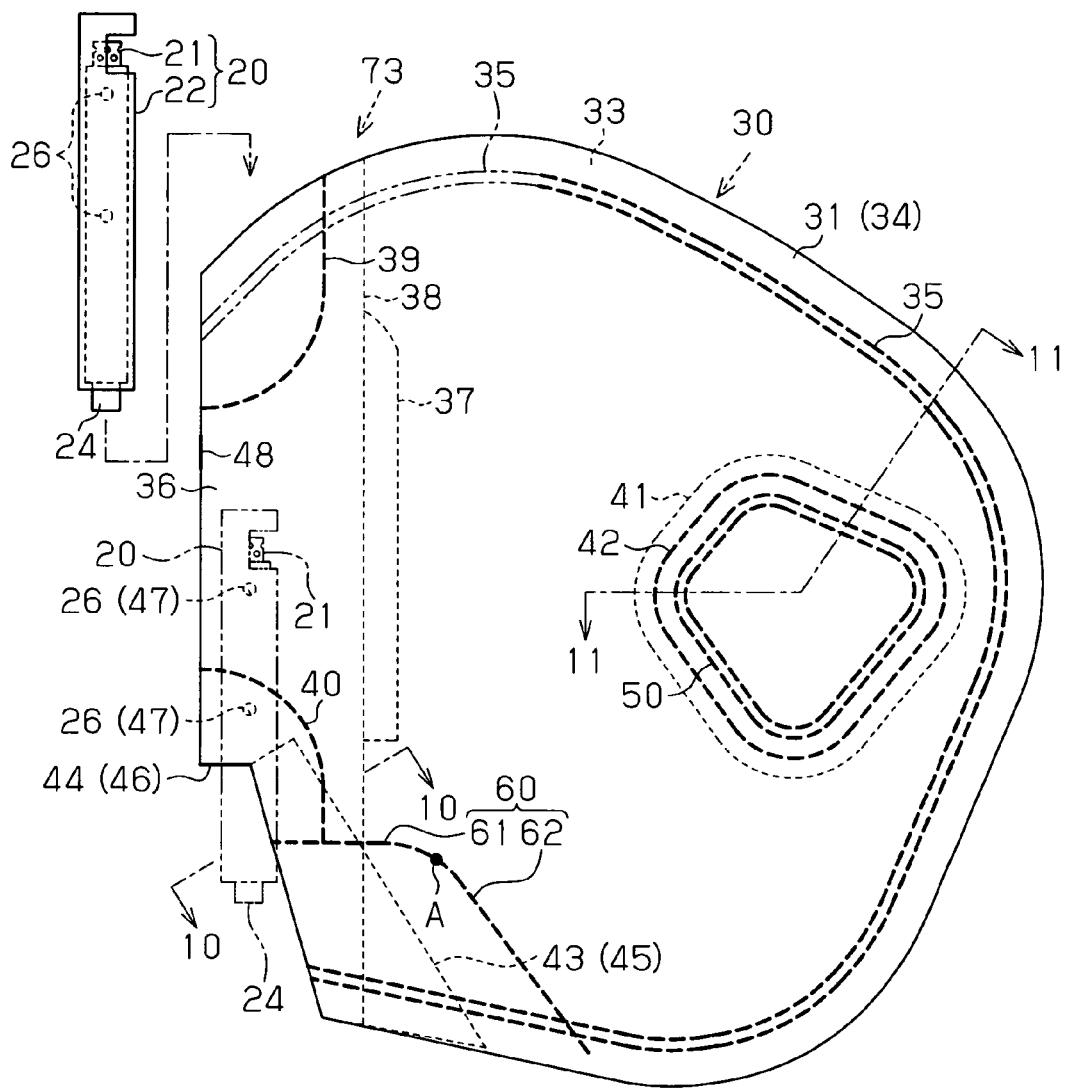
FIG. 8 is a side view illustrating a step of manufacturing the airbag module, in which a pressure reducing portion and a support joint portion are formed in the airbag.

As illustrated in FIG. 8, the inner fabric portion 33, the outer fabric portion 34, and the second reinforcing fabric 38 are sewn together using sewing threads in a lower portion of the intermediate body of the airbag 30, which is formed in the above-described step (IV). The support joint portion 60, which satisfies the above-described conditions (i) to (iii), is thus formed.

In the airbag 30, the portions of the inner and outer fabric portions 33, 34 onto which the corresponding third reinforcing fabrics 41 have been sewn are sewn together substantially in a rectangular loop-like shape using sewing thread. The pressure reducing portion 50 is thus formed and joins the inner fabric portion 33 and the outer fabric portion 34 with each other through a pair of the third reinforcing fabrics 41. This configuration causes the third reinforcing fabrics 41 to reinforce the pressure reducing portion 50 and facilitates stabilization of the shape of the pressure reducing portion 50 when the airbag 30 is inflated and deployed.

(VI) Step of Mounting Inflator Assembly 20

Subsequently, as illustrated in FIG. 8, the inflator assembly 20, which is represented by the solid lines in the drawing, is inserted through the insertion hole 73, which is formed in the upper portion of the airbag 30, in a posture extending substantially in the up-and-down direction. Then, as represented by the double-dotted chain lines in FIG. 8, the lower portion of the inflator assembly 20 is passed through the slit 46 and the connector portion 24 of the inflator 21 and the portion of the inflator 21 in the vicinity of the connector portion 24 are exposed to the exterior of the intermediate body of the airbag 30. The two bolts 26 of the retainer 22 are then received in the corresponding bolt holes 47 of the inner fabric portion 33 and exposed to the exterior of the intermediate body of the airbag 30. This causes engagement between the inflator assembly 20 and the airbag 30.

(VII) Step of Sewing Rest of Panel Fabric 31

The portions (the upper portions) of the peripheral portion of the airbag 30 that have not been sewn in the above-described step (IV) are sewn together using sewing threads, as represented by the double-dotted chain lines in FIG. 8. This completes the peripheral joint portion 35 in the peripheral portions of the inner and outer fabric portions 33, 34, as illustrated in FIG. 9. In this manner, the airbag 30, which is substantially airtight, is formed and the airbag module AM is provided in the desired form.

The peripheral joint portion 35 may be formed completely without preventing the portion (the upper portion) of the peripheral joint portion 35 from being sewn before the inflator assembly 20 is inserted into the airbag 30. In this case, after the peripheral joint portion 35 is completed, the inflator assembly 20 may be inserted upward through the slit 46 from below.

The airbag module AM is held in a compact accommodation form by folding up the airbag 30 from the developed state (see FIGS. 3 and 9) as illustrated in FIG. 5. This allows the airbag module AM to be reliably accommodated in the accommodating portion 15 of the seat back 14, which has limited dimensions.

The airbag module AM in the aforementioned accommodation form is fixed to the seat frame 16 by passing the bolts 26 of the retainer 22 through the seat frame 16 and fastening nuts 17.

The retainer 22 may be fixed to the vehicle (the seat frame 16) using members different from the bolts 26.

In addition to the airbag module AM, the side airbag apparatus has an impact sensor 75 and a control device 76, as illustrated in FIG. 1. The impact sensor 75 is formed by an acceleration sensor or the like and attached to the body side portion 11 (see FIG. 2) or the like of the vehicle. The impact sensor 75 detects a side impact applied to the body side portion 11 from the exterior of the vehicle. The control device 76 controls operation of the inflator 21 based on a detection signal of the impact sensor 75.

When the impact sensor 75 of the side airbag apparatus of the present embodiment detects that an impact greater than a predetermined value is applied to the body side portion 11 of the vehicle, the control device 76 outputs an activation signal to the inflator 21 in correspondence with the detection signal of the impact sensor 75 so that the inflator 21 is activated. In response to the activation signal, the gas generating agent in the inflator 21 generates the inflation gas G at a high temperature and under a high pressure, as illustrated in FIGS. 4 and 5. The inflator 21 thus operates to discharge the inflation gas G radially outward through the gas ports 23. As has been described, those of the gas ports 23 that are located rearward are closed by the retainer 22 and those of the gas ports 23 that are located forward are exposed from the window portion 25. The inflation gas G is thus discharged from the gas ports 23 that are located forward through the window portion 25 substantially in the forward direction of the vehicle. The forward direction of the vehicle includes an upward and forward direction and a downward and forward direction.

Figure 12:
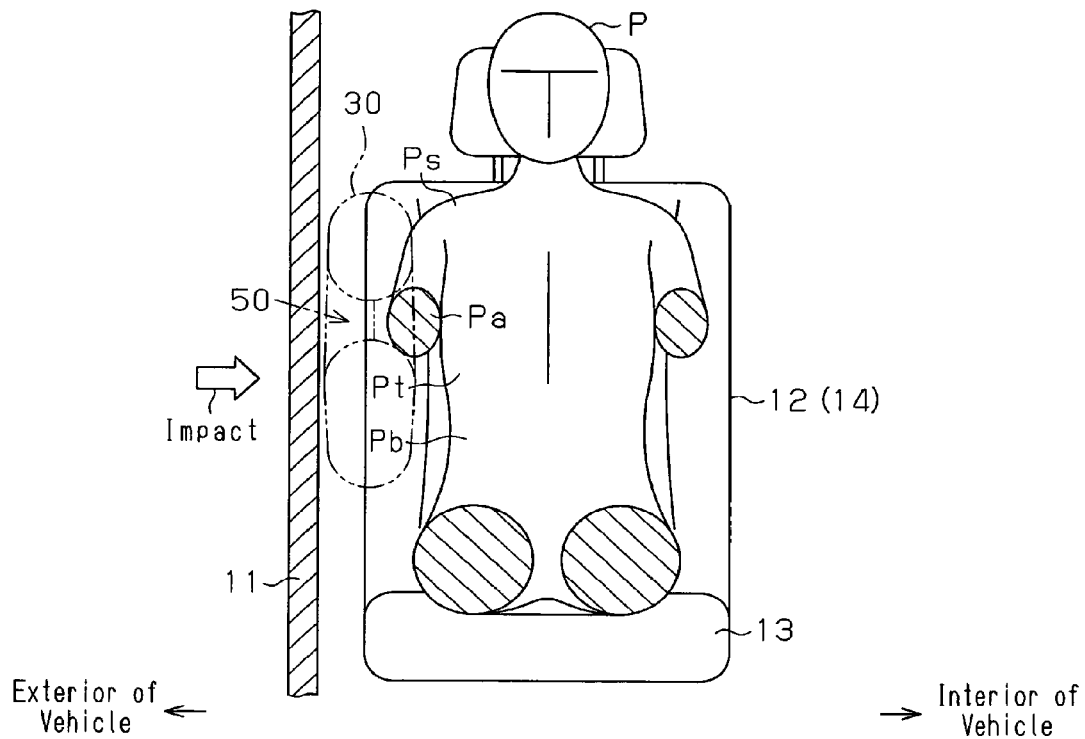
FIG. 12 is a partially cross-sectional view showing, together with the occupant and the body side portion, the vehicle seat in which the side airbag apparatus is mounted.

When the inflation gas G is supplied in this manner, the airbag 30 is inflated while being unfolded (deployed) and, together with the inflator assembly 20, pops out of the seat back 14 in the forward direction of the vehicle with the rear end portion of the airbag 30 maintained in the accommodating portion 15. Afterwards, as the inflation gas G is continuously supplied, the airbag 30 is inflated and deployed between the body side portion 11 of the vehicle and the occupant P seated on the vehicle seat 12 and in the forward direction of the vehicle, as shown in FIGS. 2 and 12. The airbag 30 is arranged between the occupant P and the body side portion 11 projecting toward the interior of the vehicle and presses the occupant P inward in the widthwise direction of the vehicle, thus restraining the occupant P. The airbag 30 attenuates the side impact transmitted to the occupant P through the body side portion 11.

In this state, the thickness of the airbag 30 in the widthwise direction of the vehicle increases by a predetermined amount in the most part of the airbag 30. Meanwhile, the thickness of the portion of the airbag 30 corresponding to the arm Pa of the occupant P, which is the portion in which the pressure reducing portion 50 is arranged, is prevented from increasing by the same amount as the amount of increase in the most part of the airbag 30. Accordingly, when the arm Pa of the occupant P (an adult) with the standard body size is located at the position corresponding to the pressure reducing portion 50 and the airbag 30 is inflated and deployed, the airbag 30 is prevented from excessively pressing the arm Pa of the occupant P inward in the widthwise direction of the vehicle. As a result, although the abdomen Pb or the thorax Pt, of which the impact resistance is relatively poor, is located inward from the arm Pa in the widthwise direction of the vehicle, the abdomen Pb or the thorax Pt is prevented from receiving excessive pressure from the arm Pa. This allows the airbag 30 to properly protect the thorax Pt and the abdomen Pb.

As has been described, the thickness of the airbag 30 in the widthwise direction of the vehicle is limited in the portion of the airbag 30 in which the support joint portion 60 is arranged and the vicinity of this portion. Accordingly, if the support joint portion 60 is located at the position corresponding to the abdomen Pb of the occupant P when the airbag 30 is inflated and deployed, the function of the airbag 30 protecting the abdomen Pb from the impact may be hampered. However, in the present embodiment, the airbag 30 is accommodated in the accommodating portion 15, which is located diagonally rearward from and in the vicinity of the occupant P, and inflated and deployed with the rear end portion of the airbag 30 maintained in the accommodating portion 15. Accordingly, when the airbag 30 of the present embodiment is inflated and deployed, the support joint portion 60 is located in the vicinity of and behind the abdomen Pb of the occupant P (see FIG. 3). This allows the portion of the airbag 30 located beside the abdomen Pb of the occupant P to be inflated by a sufficiently large thickness in the widthwise direction of the vehicle. As a result, hampering of the performance of protecting the abdomen Pb caused by the support joint portion 60 is reduced.

Figures 13A, 13B:
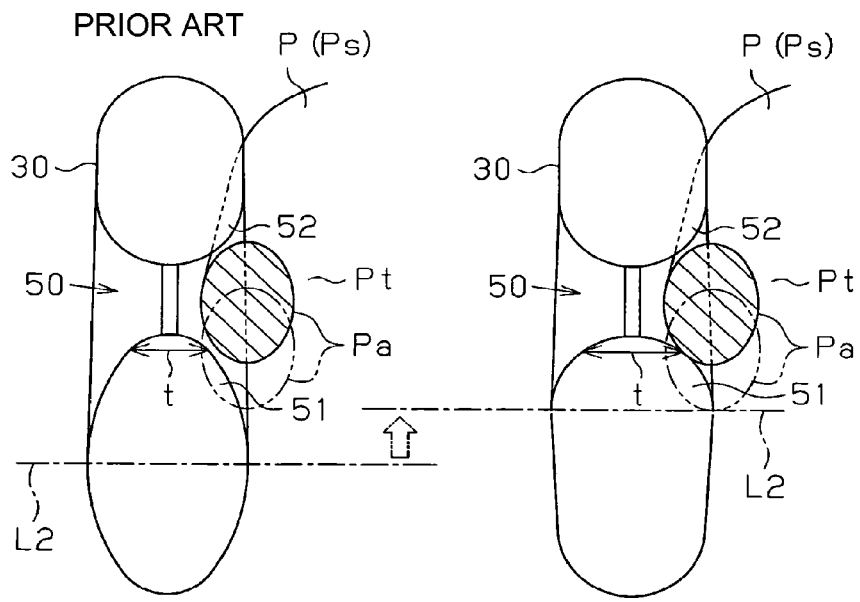
FIG. 13(A) is a schematic view illustrating operation of the pressure reducing portion without the support joint portion.
FIG. 13(B) is a schematic view illustrating operation of the pressure reducing portion with the support joint portion.

FIG. 13(A) is a cross-sectional view showing the airbag 30 without the support joint portion 60 and FIG. 13(B) is a cross-sectional view of the airbag 30 with the support joint portion 60. The aforementioned side airbag apparatus described in Japanese Laid-Open Patent Publication No. 2005-53465 corresponds to the airbag 30 illustrated in the former drawing (FIG. 13(A)). The side airbag apparatus of the present embodiment corresponds to the latter drawing (FIG. 13(B)). The horizontal lines L2 in FIGS. 13(A) and 13(B) each include the portion of the airbag 30 of which the thickness in the widthwise direction of the vehicle is maximum.

As has been described, the present embodiment has the support joint portion 60, which meets the aforementioned conditions (i) to (iii). In this configuration, the portion (represented by line L2) of the airbag 30 of which the thickness in the widthwise direction of the vehicle becomes maximum when the airbag 30 is inflated and deployed is located at a higher position than to the case without the support joint portion 60. This arrangement causes a portion 51 of the airbag 30 of the present embodiment, which is located in the vicinity of and below the pressure reducing portion 50, to curve with a radius of curvature greater than that of the case without the support joint portion 60 (FIG. 13(A)). As a result, the thickness t of the portion 51 in the widthwise direction of the vehicle increases. The portion 51, which has the increased thickness t, thus allows the arm Pa of the occupant P to be easily raised compared to the case without the support joint portion 60.

As a result, even though the arm Pa is located slightly offset downward from the portion corresponding to the pressure reducing portion 50 as represented by the double-dotted chain lines in FIG. 13(B) before the airbag 30 is inflated and deployed, the arm Pa is raised by the portion 51 as the airbag 30 is inflated and deployed. This guides the arm Pa to the position corresponding to the pressure reducing portion 50, in other words, to the portion of the airbag 30 of which the thickness t in the widthwise direction of the vehicle is limited, as illustrated in FIG. 13(B). Specifically, the arm Pa of the occupant P may be located offset downward in the above-described manner when the occupant P, who is to be protected by the side airbag apparatus, has a body size smaller than the standard body size or the occupant P is an adult with the standard body size but his/her arm Pa is at a position lower than the pressure reducing portion 50. Also in these cases, by guiding the arm Pa in the above-described manner, the arm Pa is prevented from being pressed inward in the widthwise direction of the vehicle and applying excessive pressure onto the abdomen Pb.

When the arm Pa of the occupant P (an adult) with the standard body size is located at the position corresponding to the pressure reducing portion 50 before the airbag 30 is inflated and deployed and is raised in the above-described manner, no particular problem occurs. This is because a portion 52 of the airbag 30 located above the pressure reducing portion 50, which is a portion with a greater thickness in the widthwise direction of the vehicle than the pressure reducing portion 50, restricts upward movement of the arm Pa. The arm Pa is thus maintained at the position at which the thickness of the airbag 30 in the widthwise direction of the vehicle is restricted by the pressure reducing portion 50.

After the airbag 30 is inflated and deployed, the inflation gas G is discharged to the exterior (to the rear) of the airbag 30 through the vent slit 48 (see FIG. 3), which is formed at the rear end of the airbag 30.

The above described present embodiment has the following advantages.

(1) The pressure reducing portion 50 is formed in the airbag 30 by joining the inner fabric portion 33 and the outer fabric portion 34 with each other at the position corresponding to the arm Pa of the occupant P. This prevents the arm Pa from applying excessive pressure onto the thorax Pt or the abdomen Pb, which has relatively poor impact resistance compared to the other parts of the side of the body. The occupant P is thus reliably protected.

Further, in the present embodiment, the support joint portion 60, by which the inner fabric portion 33 and the outer fabric portion 34 are joined together, is formed in the airbag 30 at a position below the lower end 50B of the pressure reducing portion 50 and behind the front end 50F of the pressure reducing portion 50. The support joint portion 60 projects toward the pressure reducing portion 50 beyond line L1, which includes the lower end 30B of the airbag 30 and the lower end 36B of the linear portion 36. The end A of the support joint portion 60, which is located close to the pressure reducing portion 50, is arranged below the lower end 50B of the pressure reducing portion 50. In this configuration, the portion of the airbag 30 of which the thickness in the widthwise direction of the vehicle becomes maximum is located at a higher position than the case without the support joint portion 60. Further, the portion 51 of the airbag 30, which is located in the vicinity of and below the pressure reducing portion 50, curves with a greater radius of curvature than the case without the support joint portion 60. This increases the thickness t of the portion 51 in the widthwise direction of the vehicle. Accordingly, when the occupant P seated on the vehicle seat 12 has a smaller body size than the standard body size and the arm Pa of the occupant P is thus located offset downward from the pressure reducing portion 50 before the airbag 30 is inflated and deployed, the arm Pa of the occupant P is raised easily by the portion 51 with the increased thickness t, compared to the case without the support joint portion 60. This facilitates guiding of the arm Pa to the position corresponding to the pressure reducing portion 50 and prevents the arm Pa from applying excessive pressure onto the thorax Pt or the abdomen Pb when the airbag 30 is inflated and deployed. In this manner, the area of the airbag 30 suppressing excessive pressure onto the thorax Pt or the like is enlarged, and the performance of the airbag 30 restraining the occupant P is improved.

(2) When the airbag module AM is accommodated in the accommodating portion 15 of the seat back 14 and a side impact is applied to the vehicle, the airbag 30 is inflated and deployed in the forward direction of the vehicle with the rear end portion of the airbag 30 maintained in the accommodating portion 15. Accordingly, the support joint portion 60 is located behind the abdomen Pb of the occupant P after the airbag 30 has been inflated and deployed. As a result, beside the abdomen Pb, the airbag 30 is inflated with a great thickness in the widthwise direction of the vehicle. This prevents the performance of the airbag 30 protecting the abdomen Pb from being lowered by the support joint portion 60.

The present invention may be embodied in the following modifications.

<Inflator Assembly 20>

The entirety of the inflator assembly 20 may be accommodated in the airbag 30. Alternatively, the entirety of the inflator assembly 20 may be arranged outside the airbag 30. In the latter case, the inflator 21 and the airbag 30 may be connected to each other by a pipe so that the inflation gas G discharged by the inflator 21 is supplied to the airbag 30 through the pipe.

<Pressure Reducing Portion 50>

The shape of the side surface of the pressure reducing portion 50 may be changed to a shape different from that of the above embodiment (the substantial trapezoidal shape), such as a circular shape, an oval shape, and a triangular shape.

The third reinforcing fabrics 41 may be omitted and the pressure reducing portion 50 may be formed by sewing the inner fabric portion 33 and the outer fabric portion 34 directly with each other.

<Support Joint Portion 60>

The shape of the side surface of the support joint portion 60 may be modified to a shape different from that of the above embodiment. Examples of modified shapes are illustrated in FIGS. 14(A) and 14(B).

Figure 14A:
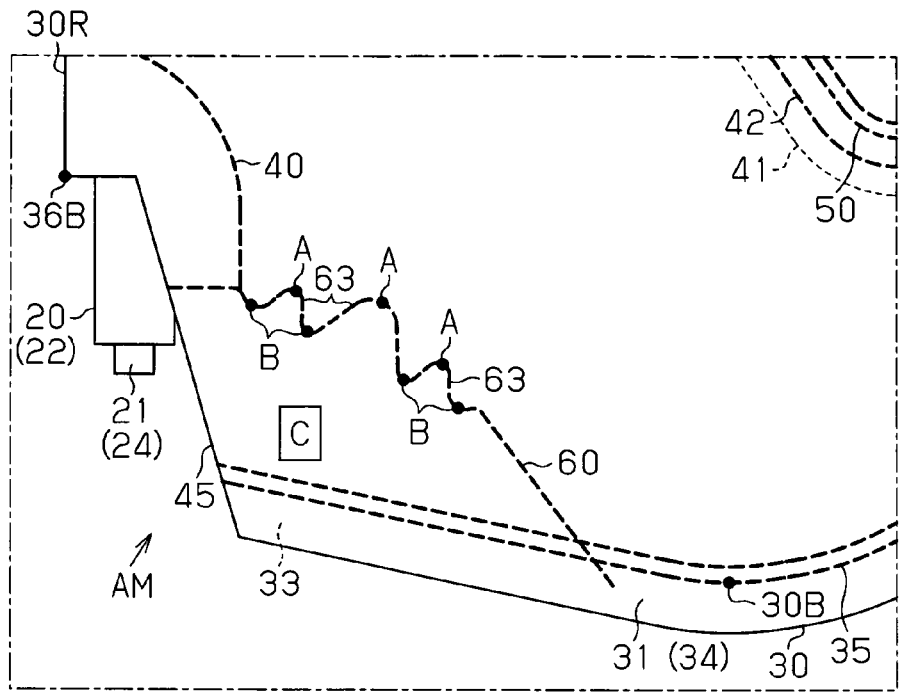
FIGS. 14(A) and 14(B) are cross-sectional views each illustrating a support portion having a shape according to another embodiment.

In FIG. 14(A), the support joint portion 60 has a plurality of portions 63 projecting toward the pressure reducing portion 50. The vertex of each of the portions 63 corresponds to the end A of the support joint portion 60 located close to the pressure reducing portion 50. Accordingly, in this case, the support joint portion 60 includes a plurality of ends A. The ends A of the portions 63 are arranged in a wavy form. In other words, the portions 63, as a whole, are arranged in a wavy manner.

Figure 14B:
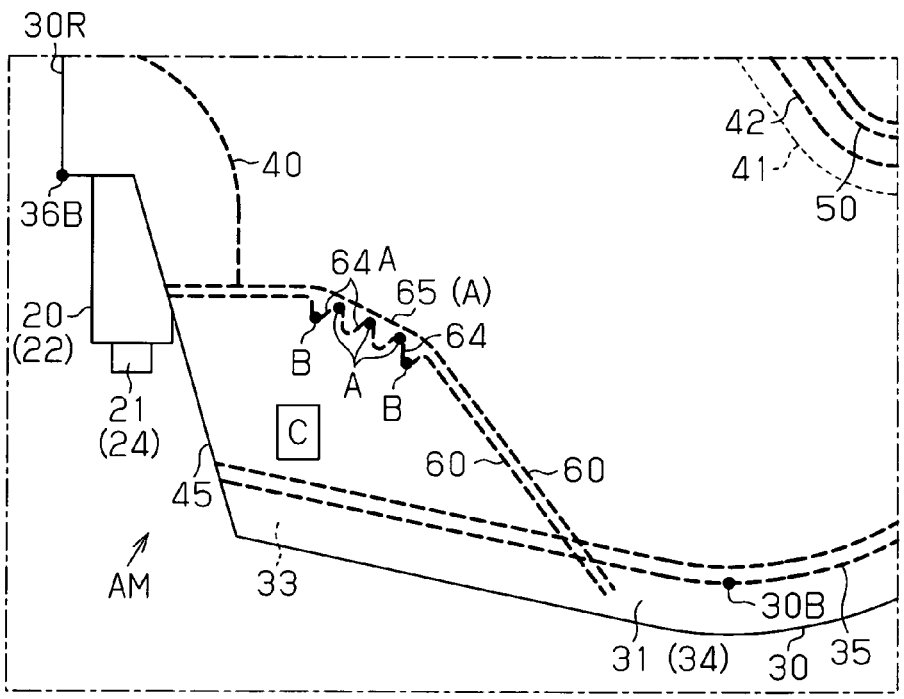

FIG. 14(B) illustrates two types of support joint portions 60. The lower support joint portion 60 in FIG. 14(B) has a plurality of portions 64 projecting toward the pressure reducing portion 50. The vertex of each of the portions 64 corresponds to the end A of the support joint portion 60 close to the pressure reducing portion 50. Accordingly, also in this case, the support joint portion 60 has a plurality of ends A. The ends A of the portions 64 are arranged linearly, and the portions 64, as a whole, are arranged in a linear shape extending substantially in the front-and-rear direction.

The upper support joint portion 60 in FIG. 14(B) includes a linear portion 65. The linear portion 65 extends substantially perpendicularly to the direction in which the portions 64 project toward the pressure reducing portion 50. The linear portion 65 corresponds to the end A of the support joint portion 60 close to the pressure reducing portion 50.

In FIGS. 14(A) and 14(B), the bottom of each of the portions 63, 64 of the support joint portion 60, which is the end of each portion 63, 64 spaced from the pressure reducing portion 50, is referred to as an end B. The ends B may project downward with respect to the aforementioned lines L1, L1'.

The support joint portion 60 as a whole may be formed in an arcuate shape projecting toward the pressure reducing portion 50.

The "lower end 36B of the linear portion 36" in the condition (ii) may be changed to the "lower end of the inflator 21 or the inflator assembly 20". In this case, the condition (ii) is that "the support joint portion 60 has a portion projecting toward the pressure reducing portion 50 beyond line L1' including the lower end 30B of the airbag 30 and the lower end of the inflator 21 (or the inflator assembly 20)". This also increases the thickness t of the portion 51, which is located below and in the vicinity of the pressure reducing portion 50, in the widthwise direction of the vehicle. The pressure reducing portion 50 is thus allowed to raise the arm Pa and guides the arm Pa to the portion of the airbag 30 of which the thickness t in the widthwise direction of the vehicle is limited by the pressure reducing portion 50. This also ensures the same operation and advantages as those of the above embodiment.

<Other Modifications>

As illustrated in FIGS. 14(A) and 14(B), the area C surrounded by the peripheral joint portion 35 and the support joint portion 60 between the inner fabric portion 33 and the outer fabric portion 34 is disconnected from the area inflated by the inflation gas G. This prevents the inflation gas G from entering and inflating the area C. The area C of the airbag 30 of the above embodiment is configured also in this manner.

However, communication between the area C and the area inflated by the inflation gas G may be permitted by not sewing a portion of the peripheral joint portion 35. In this case, the inflation gas G flows into the area C, thus inflating the area C. Regardless of whether the area C is inflated, the support joint portion 60 allow a portion of the airbag 30 of which the thickness becomes maximum in the widthwise direction of the vehicle when the airbag 30 is inflated to be located at a relatively high position.

The airbag 30 may be an airbag that restrains (protects) a broader area of the occupant P including the thorax Pt and the abdomen Pb.

Therefore, the present examples and embodiments are to be considered as illustrative and not restrictive and the invention is not to be limited to the details given herein, but may be modified within the scope and equivalence of the appended claims.

What is claimed is:

1. A side airbag apparatus comprising:

an airbag formed by laying an inner fabric portion and an outer fabric portion on top of each other along a widthwise direction of a vehicle and joining the peripheral portions of the inner and outer fabric portions with each other;

an inflator that supplies inflation gas into the airbag in response to a side impact applied to the vehicle and inflates and deploys the airbag between an occupant seated on a vehicle seat and a body side portion of the vehicle and toward a front portion of the vehicle; and a looped pressure reducing portion formed by joining the inner fabric portion and the outer fabric portion together at a position corresponding to an arm of the occupant, wherein the airbag has a linear portion that extends substantially perpendicularly to a deploying direction of the airbag and is located at a rear end portion of the airbag, the inflator being arranged in the linear portion of the airbag, the pressure reducing portion limiting a thickness of the airbag in the widthwise direction of the vehicle at the position corresponding to the arm of the occupant, thereby preventing the airbag from pressing the arm inward in the widthwise direction of the vehicle, wherein a support joint portion joining the inner fabric portion and the outer fabric portion together is arranged at a position that is located below a lower end of the pressure reducing portion and behind a front end of the pressure reducing portion when the airbag is arranged in such a manner that the linear portion is held in a posture extending vertically, and wherein the support joint portion has a middle portion that projects toward the pressure reducing portion beyond both a line including a lower end of the airbag and a lower end of the linear portion and a line including a lower end of the airbag and a lower end of the inflator, wherein the middle portion of the support joint portion is located below the lower end of the pressure reducing portion, and the middle portion is the closest portion of the support joint portion to the pressure reducing portion so that a portion of the airbag of which the thickness in the widthwise direction of the vehicle becomes maximum when the airbag is inflated is located between the support joint portion and the pressure reducing portion in a vertical direction.

2. The side airbag apparatus according to claim 1, wherein the support joint portion is arranged at such a position that, when the airbag is inflated and deployed, the support joint portion is located behind the abdomen of the occupant.

3. The side airbag apparatus according to claim 1, wherein the pressure reducing portion is formed by sewing the inner fabric portion, the outer fabric portion, and a reinforcing fabric arranged between the inner and outer fabric portions together using a sewing thread.

4. The side airbag apparatus according to claim 1, wherein the support joint portion is formed by sewing the inner fabric portion and the outer fabric portion together along a bent sewing line.

* * * * *